United States Patent
Igawa et al.

(10) Patent No.: US 11,485,807 B2
(45) Date of Patent: Nov. 1, 2022

(54) POLYPROPYLENE RESIN COMPOSITION, PRECISION-INJECTION-MOLDED OBJECT, MOLD FOR MOLDING OPTICAL MEMBER, AND PROCESS FOR PRODUCING OPTICAL MEMBER

(71) Applicant: SUMITOMO CHEMICAL COMPANY, LIMITED, Tokyo (JP)

(72) Inventors: Nao Igawa, Ichihara (JP); Mariko Shibata, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 18 days.

(21) Appl. No.: 16/096,385

(22) PCT Filed: Apr. 25, 2017

(86) PCT No.: PCT/JP2017/016388
§ 371 (c)(1),
(2) Date: Oct. 25, 2018

(87) PCT Pub. No.: WO2017/188255
PCT Pub. Date: Nov. 2, 2017

(65) Prior Publication Data
US 2019/0135957 A1   May 9, 2019

(30) Foreign Application Priority Data
Apr. 28, 2016 (JP) .............................. JP2016-091450

(51) Int. Cl.
| | | |
|---|---|---|
| *C08F 210/06* | (2006.01) | |
| *C08K 5/098* | (2006.01) | |
| *C08L 23/10* | (2006.01) | |
| *C08L 23/16* | (2006.01) | |
| *B29C 45/00* | (2006.01) | |
| *C08K 5/527* | (2006.01) | |
| *C08K 5/00* | (2006.01) | |
| *B29K 23/00* | (2006.01) | |
| *B29L 11/00* | (2006.01) | |

(52) U.S. Cl.
CPC ........ *C08F 210/06* (2013.01); *B29C 45/0001* (2013.01); *C08K 5/098* (2013.01); *C08K 5/527* (2013.01); *C08L 23/10* (2013.01); *C08L 23/16* (2013.01); *B29K 2023/12* (2013.01); *B29L 2011/00* (2013.01); *C08F 2800/20* (2013.01); *C08K 5/0083* (2013.01)

(58) Field of Classification Search
CPC ... B29C 45/0001; C08F 210/06; C08K 5/527; C08K 5/098; C08L 23/10; C08L 23/16; B29K 2023/12; B29L 2011/00
USPC ........................................................ 524/141
See application file for complete search history.

(56) References Cited

U.S. PATENT DOCUMENTS

| | | | | |
|---|---|---|---|---|
| 4,407,766 A | * | 10/1983 | Haardt ............. | B29D 11/00019 249/117 |
| 5,264,174 A | * | 11/1993 | Takei ...................... | C08L 23/12 264/211.23 |
| 6,294,632 B1 | | 9/2001 | Shiraishi et al. | |
| 2004/0044106 A1 | | 3/2004 | Portnoy et al. | |
| 2006/0127282 A1 | | 6/2006 | Yamashita et al. | |
| 2006/0135679 A1 | * | 6/2006 | Winowiecki ............ | C08L 23/10 524/515 |
| 2010/0292392 A1 | * | 11/2010 | Kanzaki .................. | C08L 23/10 524/528 |
| 2013/0324661 A1 | * | 12/2013 | Hoslet .................... | B65D 41/00 524/570 |

FOREIGN PATENT DOCUMENTS

| | | |
|---|---|---|
| CN | 1478122 A | 2/2004 |
| JP | 10-36587 A | 2/1998 |
| JP | 2004-514775 A | 5/2004 |
| JP | 2005-314490 A | 11/2005 |
| JP | 2007-277283 A | 10/2007 |
| JP | 2008-150571 A | 7/2008 |
| JP | 2008-303270 A | 12/2008 |
| JP | 2009-19119 A | 1/2009 |
| JP | 2010-241933 A | 10/2010 |
| JP | 2012-7142 A | 1/2012 |
| JP | 2012-20761 A | 2/2012 |
| JP | 2013-59896 A | 4/2013 |
| WO | 02/44260 A2 | 6/2002 |
| WO | 2005/059025 A1 | 6/2005 |

OTHER PUBLICATIONS

Communication dated Sep. 23, 2019 from European Patent Office in counterpart EP Application No. 17789537.2.
International Search Report dated Jul. 18, 2017, issued by the International Searching Authority in application No. PCT/JP2017/016388.
International Preliminary Report on Patentability with translation of Written Opinion dated Nov. 8, 2018, issued by the International Searching Authority in application No. PCT/JP2017/016388.
Androsch et al., "Effect of an alpha-phase nucleating agent on the crystallization kinetics of a propylene/ethylene random copolymer at largely different supercooling", Journal of Crystal Growth, 2014, vol. 408, pp. 91-96 (total 6 pages).
Li Liying et al., "Non-isothermal crystallization kinetics of impact PP copolymer with different nucleating agents", China Synthetic Resin and Plastics, 2015, vol. 32, No. 2, pp. 61-65 (total 5 pages).

(Continued)

*Primary Examiner* — Doris L Lee
(74) *Attorney, Agent, or Firm* — Sughrue Mion, PLLC (57) ABSTRACT

Disclosed is a polypropylene resin composition which contains a polypropylene-based polymer containing, as monomer units, propylene and at least one copolymerization monomer of ethylene or α-olefins with carbon atom number of 4 or more. Proportion of the monomer units derived from the copolymerization monomer in the polypropylene-based polymer is 2 to 10% by mass based on the mass of the polypropylene-based polymer. A crystallization half-time at 110° C. of the polypropylene resin composition is 20 seconds or shorter.

9 Claims, 2 Drawing Sheets

(56) References Cited

OTHER PUBLICATIONS

Office Action dated Jul. 2, 2020 from the China National Intellectual Property Administration in Application No. 201780025698.4.
Notice of Reasons for Rejection dated Mar. 9, 2021 from the Japanese Patent Office in JR Application English No. 2018-514624.
Office Action dated Nov. 24, 2020 in Chinese Application No. 201780025698.4.
Communication dated May 11, 2021 from The State Intellectual Property Office of P.R. of China in Application No. 201780025698.4.
Wang Lan et al., "Polymeric Materials (1st Edition)", China Light Industry Press, Jan. 31, 2009, pp. 293 (8 total pages).
Zhu Zhaonan, "Application and Modification of Polypropylene Plastics (1st edition)" Light Industry Press, Jan. 31, 1982, pp. 11-12 and 37 (11 pages total).
Communication dated Sep. 27, 2021 from the China National Intellectual Property Administration in Chinese Application No. 201780025698.4.
Notice of Reasons for Rejection dated Oct. 5, 2021 from the Japanese Patent Office in Japanese Application No. 2018-514624.
Communication dated Mar. 1, 2022 from the European Patent Office in European Application No. 17 789 537.2.

\* cited by examiner

POLYPROPYLENE RESIN COMPOSITION, PRECISION-INJECTION-MOLDED OBJECT, MOLD FOR MOLDING OPTICAL MEMBER, AND PROCESS FOR PRODUCING OPTICAL MEMBER

CROSS REFERENCE TO RELATED APPLICATIONS

This application is a National Stage of International Application No. PCT/JP2017/016388 filed Apr. 25, 2017, claiming priority based on Japanese Patent Application No. 2016-091450 filed Apr. 28, 2016.

TECHNICAL FIELD

The present invention relates to a polypropylene resin composition, a precision-injection-molded body, a mold for molding an optical member, and a method for producing an optical member.

BACKGROUND ART

High dimensional precision is generally required for small-sized or thin injection-molded bodies, and it may be referred to as a precision-injection-molded body. There is a case where the precision-injection-molded body itself is used as a constitutional member of various devices, and there is also a case where it is used as a mold for producing various precision molded bodies.

As a molding material for producing precision-injection-molded bodies, use of a polypropylene resin composition containing polypropylene-based polymer like propylene-ethylene copolymer has been studied (for example, Patent Literatures 1 and 2). It is expected that the use of a relatively inexpensive polypropylene-based polymer as a molding material can contribute to the cost reduction of precision-injection-molded bodies.

CITATION LIST

Patent Literature

Patent Literature 1: Japanese Unexamined Patent Application Publication No. 2013-59896
Patent Literature 2: Japanese Unexamined Patent Application Publication No. 2004-514775

SUMMARY OF INVENTION

Technical Problem

However, the precision-injection-molded body of a related art that is molded by using a polypropylene resin composition tends to easily have an occurrence of deformation after molding. Once deformation occurs inside a molded body, there is a possibility that a change in the shape of a molded body is caused, and thus, in the case of a precision-injection-molded body, it is important to suppress the occurrence of deformation after molding as much as possible.

Accordingly, a main object of the present invention is to reduce an occurrence of deformation after molding, with regard to a precision-injection-molded body of a polypropylene resin composition.

Solution to Problem

An aspect of the present invention relates to a polypropylene resin composition containing a polypropylene-based polymer which is a copolymer containing, as monomer units, propylene and at least one copolymerization monomer of ethylene or α-olefins with carbon atom number of 4 or more. The proportion of the monomer units derived from the copolymerization monomer in the polypropylene-based polymer is 2 to 10% by mass based on the mass of the polypropylene-based polymer. The crystallization half-time at 110° C. of the polypropylene resin composition is 20 seconds or shorter. In other words, an aspect of the present invention relates to an application of the polypropylene resin composition for producing a precision-injection-molded body.

With this polypropylene resin composition for precision-injection-molding, an occurrence of deformation in a precision-injection-molded body can be reduced. Since polypropylene is a crystalline resin, tiny crystals typically grow in a molded body. It is considered that growth of large-sized crystals may result in an occurrence of deformation in a molded body. As the proportion of monomer units derived from the copolymerization monomer (hereinbelow, it may be also referred to as "content of copolymerization monomer") is 2 to 10% by mass, there is a tendency that size of crystals formed in a molded body is small compared to polypropylene homopolymers or the like. Furthermore, as the crystallization half-time of the polypropylene resin composition is 20 seconds or shorter, the crystallization progresses rapidly at the time of injection molding, and thus it is unlikely to have a progress of the crystallization after completion of the molding. As such, it is believed that, according to combination of reducing crystal size and allowing sufficient progress of the crystallization at the time of injection molding, an occurrence of deformation after molding is significantly suppressed.

According to another aspect, the present invention relates to a precision-injection-molded body composed of the above-described polypropylene resin composition for precision-injection-molding. The present invention also provides a method for producing a precision-injection-molded body including a step of forming a precision-injection-molded body by precision-injection-molding of the above-described polypropylene resin composition for precision-injection-molding.

According to still another aspect, the present invention relates to a mold for molding an optical member including the precision-injection-molded body. The present invention also relates to a method for producing an optical member including a step of forming an optical member by molding a molding material with the mold for molding an optical member as a mold. Using the precision-injection-molded body of the present invention, which has little deformation, as a mold for molding an optical member enables stable production of an optical member with high dimensional precision. Producing an optical member with high dimensional precision is very important for obtaining stably the desired optical characteristics of the optical member.

Advantageous Effects of Invention

According to the present invention, an occurrence of deformation after molding can be reduced, with regard to a precision-injection-molded body of a polypropylene resin composition.

DESCRIPTION OF EMBODIMENTS

Hereinbelow, several embodiments of the present invention are described in detail. However, the present invention is not limited to the following embodiments.

The polypropylene resin composition according to an embodiment contains, as a main component, a polypropylene-based polymer which is a random copolymer of propylene and at least one copolymerization monomer of ethylene or α-olefins with carbon atom number of 4 or more. Content of the polypropylene-based polymer is generally 80% by mass or more, or 90% by mass or more based on the mass of the polypropylene resin composition.

The polypropylene-based polymer according to the embodiment is a random copolymer which is mainly composed of monomer units derived from propylene and contains a small amount of a monomer units derived from copolymerization monomers like ethylene. In this polypropylene-based polymer, the proportion of the monomer units derived from copolymerization monomers like ethylene (content of the copolymerization monomers) is 2 to 10% by mass based on the mass of the polypropylene-based polymer. The monomer units derived from copolymerization monomers contribute to reducing the size of crystals growing in a molded body. To obtain a more significant effect of deformation reduction, the content of the copolymerization monomers may be 3% by mass or more. Meanwhile, if the content of the copolymerization monomers is more than 10% by mass, mechanical strength, heat resistance, or the like of a molded body tend to decrease. From the same point of view, the content of the copolymerization monomers may be 5% by mass or less.

The α-olefins with carbon atom number of 4 or more is a monomer that is capable of reducing the crystallinity of a polypropylene-based polymer similar to ethylene, and the carbon atom number of it may be 8 or less. Examples of the α-olefins with carbon atom number of 4 to 8 include 1-butene, 1-hexene, 4-methyl-1-pentene, and 1-octene.

Specific examples of the polypropylene-based polymer include a propylene-ethylene copolymer, a propylene-1-butene copolymer, a propylene-ethylene-1-butene copolymer, a propylene-1-hexene copolymer, and a propylene-ethylene-1-hexene copolymer. With a propylene-ethylene copolymer, there is a tendency that a particularly higher effect regarding the deformation reduction is obtained.

When molecular weight distribution (weight average molecular weight Mw/number average molecular weight Mn) of the polypropylene resin composition or polypropylene-based polymer is small, there is a tendency that a molded body with more reduced deformation after molding and further having high mechanical strength and high transparency is easily obtained. There is also a tendency that components eluted from a molded body due to a solvent are reduced. From these points of view, the molecular weight distribution of the polypropylene resin composition may be 5 or less, 4 or less, or 3 or less. The lower limit of the molecular weight distribution is 1, but, in general, there are many cases in which it is 2 or more.

The melt flow rate (MFR) at 230° C. of the polypropylene resin composition may be 0.5 to 500 g/10 minutes, 10 to 100 g/10 minutes, 22 to 80 g/10 minutes, or 25 to 50 g/10 minutes. When the polypropylene resin composition has an appropriate melt flow rate, favorable fluidity can be easily obtained in the case of injection-molding the polypropylene resin composition. From the same point of view, the limiting viscosity [η] of the polypropylene resin composition may be 0.5 to 4 dl/g, 1 to 3 dl/g, or 1 to 2 dl/g.

The polypropylene-based polymer can be produced by polymerizing an olefin monomer mixture containing propylene according to common methods. For example, the polypropylene-based polymer can be obtained according to polymerization by a slurry polymerization method, a solution polymerization method, a liquid phase polymerization method in which olefin monomers are used as a medium, or a vapor phase polymerization method, in the presence of a solid catalyst for stereotactic polymerization containing a titanium atom and an electron-donating compound described in Japanese Unexamined Patent Application Publication No. H7-216017. The proportion of the electron-donating compound used therein is typically 0.01 to 500 mol, and it may be 0.01 to 100 mol or 0.01 to 50 mol, relative to 1 mol of titanium atoms contained in the solid catalyst.

The crystallization half-time at 110° C. of the polypropylene resin composition according to the embodiment is 20 seconds or shorter. As the crystallization half-time is short, crystallization progresses rapidly at the time of injection molding, and thus it is unlikely to have a progress of the crystallization after molding. This can also contribute to the reduction of deformation of a molded body. From the same point of view, the crystallization half-time may be 15 seconds or shorter, or 8 seconds or shorter. The lower limit of the crystallization half-time is not particularly limited, but it may be 1 second or longer.

The crystallization half-time of the polypropylene resin composition can be controlled by using a nucleating agent, for example. There is a tendency that shorter crystallization half-time is yielded as the content of a nucleating agent is high. To obtain appropriate crystallization half-time, the content of the nucleating agent can be controlled within a range of from 50 ppm by mass or more to 3500 ppm by mass or less based on the mass of the polypropylene-based polymer, for example. From the viewpoint of enhancing the transparency of a molded body, the content of the nucleating agent may be 150 ppm by mass or more, 200 ppm by mass or more, or 400 ppm by mass or more. From the viewpoint of suppressing die contamination at the time of injection molding, the content of a nucleating agent may be 2500 ppm by mass or less, 2000 ppm by mass or less, or 1500 ppm by mass or less.

The nucleating agent can be selected from those commonly used as a nucleating agent for a polypropylene resin composition. The nucleating agent may be a type of promoting nucleus formation. The nucleating agent of a dispersion type can be selected from this point of view. The dispersion type may contain at least one kind selected from the group consisting of metal salt of a carboxylic acid, metal salt of an organophosphoric ester, and an amide-based organic compound. The metal salt of the carboxylic acid may be referred to as a carboxylic acid-based nucleating agent by a person skilled in the art. With the metal salt of the carboxylic acid, a particularly excellent effect is obtained in terms of deformation reduction of a molded body. Examples of a commercially available product containing a metal salt of a carboxylic acid include Hyperform (registered trademark) HPN-68L, manufactured by Milliken & Company Japan), Chiba 20M, Chiba 40M (manufactured by Ciba Specialty Chemicals Inc.), PINECRYSTAL KM-1500 (manufactured by ARAKAWA CHEMICAL INDUSTRIES, LTD.), and AL-PTBBA (manufactured by KYODO CHEMICAL COMPANY LIMITED)

The polypropylene resin composition may contain other components, if necessary. Examples of the other components include an anti-oxidant, a neutralizing agent, a heat-resistant stabilizer, an anti-static agent, an anti-blocking agent, a lubricating agent, a slip agent, a hydrochloric acid absorbing agent, a peroxide, and a colorant. In particular, adding a peroxide during melt-kneading can effectively contribute to the effect of deformation reduction. Specific examples of the peroxide include alkyl peroxides, diacyl peroxides, peroxide esters, and peroxide carbonates. Addition amount of the peroxide may be 0.0001 to 1% by mass based on the mass of the polypropylene resin composition.

The polypropylene resin composition according to the embodiment can be used as a molding material for forming a precision-injection-molded body by precision-injection-molding. The precision-injection-molded body is a molded body that has a volume of 100 cm$^3$ or less, 50 cm$^3$ or less, or 30 cm$^3$ or less and/or a thickness of 50 mm or less, or 30 mm, for example. A molded body that has a surface with dimension tolerance of 1 mm or less can be also classified as a precision-injection-molded body. In addition, among the molded bodies obtained by injection molding, a molded body that has a product ratio (proportion of mass of a molded body part (part inside a mold) as a product relative to mass of a resin composition injected by one time injection molding) of 50% by mass or less can be also classified as a precision-injection-molded body. As the precision-injection-molded body has a small size, the part remained in a flow path or the like inside an injection molding device and not formed into a product (molded body), among the injected resin composition, tends to increase.

Specific examples of the precision-injection-molded body include a constitutional member of an information-communication device, a constitutional member of an electric device, and a constitutional member of an optical product.

The precision-injection-molded body can be an optical member such as optical lens, optical prism, optical mirror, lens for VTR camera, lens for projection TV, lens for watch, small display, contact lens, lens for laser printer, or CD pickup lens, or a mold for producing them. The mold has a cavity that corresponds to the shape of a molded body. To form an optical member with high dimensional precision, the mold is also required to have high dimensional precision. Optical members can be produced by molding a molding material with a mold for molding an optical member as a mold. For example, an optical member can be formed by introducing a polymerizable molding material into a cavity of a mold and performing photopolymerization or thermal polymerization of the molding material inside the cavity.

Molding conditions for forming a precision-injection-molded body are not particularly limited, and they can be suitably set within a range of conditions for common injection molding. For example, the molding temperature (cylinder temperature of an injection molding device) is set within a range of from 180 to 300° C., the die temperature is set within a range of from 20 to 80° C., and the injection speed is set within a range of from 100 to 500 mm/sec.

EXAMPLES

Hereinbelow, the present invention is more specifically described in view of Examples. However, the present invention is not limited to those Examples.

1. Raw materials
In Examples and Comparative Examples, the following raw materials were used.

(A) Polypropylene-Based Polymer

A solid polymerization catalyst for polymerization of α-olefins was prepared according to the method described in Example 1 of Japanese Unexamined Patent Application Publication No. H7-216017. In the presence of this solid polymerization catalyst, polypropylene-based polymer A-1 in powder state, which was a propylene-ethylene random copolymer, was obtained by vapor phase polymerization of propylene and ethylene. As a result of measuring the characteristics of the obtained polypropylene-based polymer A-1 according to the method described below, the melt flow rate was 5.0 g/10 minutes and ethylene content was 3.8% by mass.

The following propylene-ethylene random copolymer or propylene homopolymer was obtained by the same method except that the amount of ethylene was modified.

Polypropylene-based polymer A-2 (melt flow rate: 1.6 g/10 minutes, ethylene content: 4.8% by mass)

Polypropylene-based polymer A-3 (melt flow rate: 23 g/10 minutes, ethylene content: 2.3% by mass)

Polypropylene-based polymer A-4 (melt flow rate: 5 g/10 minutes, ethylene content: 0% by mass)

A polypropylene-based polymer (melt flow rate: 30 g/10 minutes, ethylene content: 0.6% by mass) that had been produced by using a metallocene-based catalyst was prepared, and the polypropylene-based polymer was used as polypropylene-based polymer A-5.

(B) Anti-Oxidant

Hindered phenol-based anti-oxidant (Irganox 1010 (registered trademark), manufactured by Ciba Specialty Chemicals Inc.)

Aromatic phosphite-based anti-oxidant (Irgafos 168 (registered trademark), manufactured by Ciba Specialty Chemicals Inc.)

(C) Neutralizing Agent

Magnesium aluminum hydroxide carbonate (DHT-4C, manufactured by Kyowa Chemical Industry Co., Ltd.)

(D) Nucleating agent

Metal salt of aromatic phosphoric acid ester (mixture of hydroxyaluminum-bis [2,2-methylene-bis(4,6-di-tert-butylphenyl)phosphate], (compound represented by the formula (21a)) and lithium salt of aliphatic monocarboxylic acid with carbon atom number of 8 to 20, ADEKASTAB NA-21 (registered trademark), manufactured by ADEKA Corporation)

(21a)

Sodium salt of carboxylic acid (containing disodium (1R,2R,3S,4S)-bicyclo[2.2.1]heptane-2,3-dicarboxylate in an amount of 80% by weight, Hyperform (registered trademark) HPN-68L, manufactured by Milliken & Company Japan)

Triaminobenzene-based nucleating agent (Irgaclear (registered trademark) XT386, manufactured by BASF)

1,3:2,4-Bis-O-(4-methylbenzylidene)-D-sorbitol (Gel All MD, trade name, manufactured by New Japan Chemical Co., Ltd.)

Nucleating agent master batch MB-1 (RM-M105, manufactured by Dainichiseika Color & Chemicals Mfg. Co., Ltd., containing HPN-68L in an amount of 5% by weight, melt flow rate: 10 to 11 g/10 minutes)

Nucleating agent master batch MB-2 (RM-M102, manufactured by Dainichiseika Color & Chemicals Mfg. Co., Ltd., containing HPN-68L in an amount of 1.7% by weight, melt flow rate: 10 to 11 g/10 minutes)

(E) Peroxide

Peroxide master batch E-1 (mixture of crystalline propylene/ethylene/butene random copolymer, which has propylene content of 93.3% by mass, ethylene content of 2.2% by mass, butene content of 4.5% by mass, melt flow rate of 7.0 g/10 minutes, melting point of 140° C., and content of xylene solubles of 1.7% by mass, and Perhexa 25B impregnated therein (manufactured by NOF CORPORATION, chemical name: 2,5-dimethyl-2,5-di(t-butylperoxy)hexane). Content of Perhexa 25B: 8% by mass).

2. Evaluation of Polypropylene-Based Polymer and Polypropylene Resin Composition 2-1. Content of Monomer Units Derived from Ethylene (Ethylene Content)

IR spectrum of the polypropylene-based polymer was measured. From the obtained IR spectrum data, content of monomer units (unit: % by mass) that are derived from ethylene was obtained according to the "(i) Method relating to random copolymer" which is described at page 616 of Handbook for Polymer Analysis (1995, published by Kinokuniya Books).

2-2. Melt Flow Rate (MFR, Unit: g/10 Minutes)

According to the method of Condition 14 of JIS K 7210, melt flow rate of the polypropylene-based polymer and polypropylene resin composition was measured at conditions including temperature of 230° C. and a load of 21.18 N.

2-3. Melting Point Tm (unit: ° C.) and Crystallization Temperature Tc (Unit: ° C.)

The polypropylene-based polymer was subjected to heat press molding to prepare a sheet with thickness of 0.5 mm. The heat press molding was carried out at conditions of, after pre-heating for 5 minutes at 230° C., increasing the pressure to 5.0 MPa over 1 minute, maintaining the pressure for 2 minutes, and then cooling for 5 minutes at 30° C. and at 5.0 MPa. For the sample collected from the obtained sheet, Tm and Tc were measured at the following conditions by using a differential scanning calorimeter (manufactured by PerkinElmer Inc., Diamond DSC).

Conditions for Measurement 10 mg of the sample was subjected to a heating treatment at 220° C. for 5 minutes under nitrogen atmosphere, and thereafter, cooled to 50° C. with temperature lowering rate of 10° C./minute. The peak top temperature of an exothermic peak which has been observed at the highest temperature side during the temperature lowering process was set as Tc [° C.]. Subsequently, after being maintained for 1 minute at 50° C., the sample was heated from 50° C. to 180° C. with temperature increasing rate of 10° C./minute, and the peak top temperature of the observed melting peak was set as Tm [° C.].

2-4. Molecular Weight Distribution

According to a gel permeation chromatography (GPC) method, weight average molecular weight (Mw) and number average molecular weight (Mn) were measured and the molecular weight distribution (Mw/Mn) was obtained. Conditions for the GPC were as those of following (1) to (8).

(1) Apparatus: Waters150C, manufactured by Water (2) Separation column: TSKgel GMH6-HT manufactured by Tosoh Corporation (3) Measurement temperature: 145° C.

(4) Carrier: Orthodichlorobenzene (5) Flow rate: 1.0 mL/minute (6) Injection amount: 500 μL (7) Detector: Differential diffraction (8) Molecular weight standard material: Standard polystyrene (TSK STANDARD POLYSTYRNE, manufactured by Tosoh Corporation).

2-5. Content of Xylene Solubles (CXS)

After completely dissolving 1 g of the polypropylene-based polymer in 100 ml of boiling xylene, temperature of the xylene was lowered to 20° C. and, at the same temperature, the resultant was allowed to stand for 4 hours. After that, fractionation into precipitates and filtrate was carried out by filtration, the xylene was distilled off, and the generated solid matter was dried at 70° C. under reduced pressure to obtain a residual matter. Percentage of the weight of the obtained residual matter relative to the weight of the polypropylene-based resin (1 g) was obtained, and the obtained value was taken as content of xylene solubles (CXS) of the polypropylene-based polymer. Considering that dissolution in xylene becomes easier as a resin component with low molecular weight and a resin component with low crystallinity increase, high CXS means that there is high content of a resin component with low molecular weight and a resin component with low crystallinity in the polypropylene-based resin.

Table 1 shows the evaluation results of the polypropylene-based polymers.

TABLE 1

| | Polypropylene-based polymer | | | | |
|---|---|---|---|---|---|
| | A-1 | A-2 | A-3 | A-4 | A-5 |
| Ethylene content (%) | 3.8 | 4.8 | 2.3 | 0 | 0.6 |
| MFR (g/10 min) | 6 | 1.5 | 23 | 8 | 30 |
| Melting point Tm (° C.) | 146 | 141 | 151 | 167 | 141 |
| Crystallization temperature Tc (° C.) | 116 | 112 | 120 | 133 | 108 |
| CXS (%) | 5.2 | 8.8 | 3.4 | 1.1 | 3.0 |

3. Preparation and Evaluation of Polypropylene Resin Composition 3-1. Pellet Preparation Raw materials having composition described in Table 2 (parts by mass) were dry-blended under nitrogen atmosphere with a Henschel mixer. The obtained mixture was melt-kneaded at 250° C. under nitrogen atmosphere with a monoaxial extruder (manufactured by TANABE PLASTICS MACHINERY CO., LTD., screw diameter of 40 mmφ, VS40-28), and thus pellets of the polypropylene resin composition were obtained.

3-2. Crystallization Half-Time $t_{1/2}$ (Unit: Sec)

Crystallization half-time ($t_{1/2}$) representing crystallization rate was measured by a depolarized light intensity method. The depolarized light intensity method is a method in which a sample in melt state is added between two pieces of a polarizing plate that are disposed such that polarized light axes are orthogonal to each other, the sample is crystallized at constant temperature, and the crystallization process is followed in terms of the intensity of transmitted light. Longer crystallization half-time indicates slower crystallization.

Figure 1:
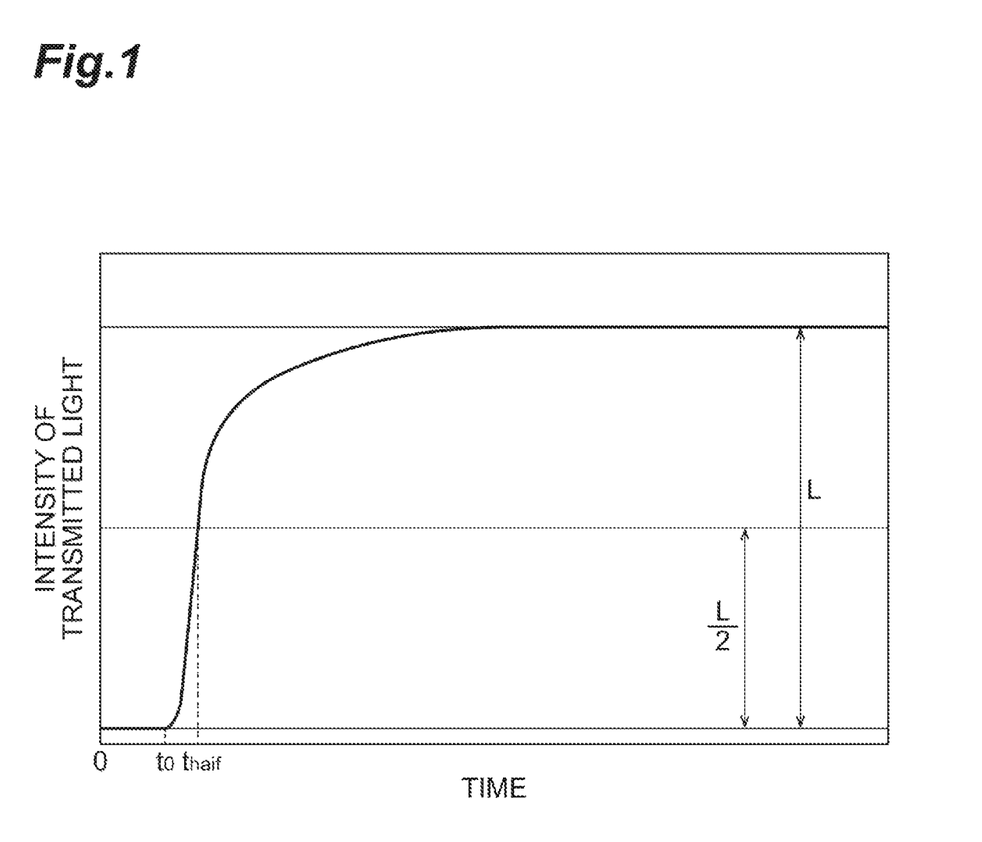
FIG. 1 is a graph showing an example of a method for determining the crystallization half-time.

Pellets of the polypropylene resin composition were molded by heat press at 190° C. to obtain a resin sheet with thickness of 100 µm. This resin sheet was cut to obtain a resin sheet sample with a size of 1.5 cm×1.5 cm. The sample was inserted between cover glasses and heated in a melting furnace at 230° C. to melt the resin sheet. After that, the cover glasses having the resin sheet in melt state inserted therebetween were added to an oil bath at 110° C., which is present between two pieces of a polarizing plate that are disposed such that polarized light axes are orthogonal to each other, and crystallization of the resin was initiated. Transmitted light which increases in accordance with a progress of the crystallization was detected, and the time at which the intensity of transmitted light is half compared with the intensity of transmitted light of a resin sheet in which the crystallization has progressed sufficiently, is set as crystallization half-time $t_{1/2}$. FIG. 1 is a graph showing an example of a method for determining the crystallization half-time on the basis of time course change of the intensity of transmitted light. The ordinate of FIG. 1 shows the intensity of light which has transmitted through the resin sheet among incident light, and the high value on the ordinate means high intensity of transmitted light. As shown in FIG. 1, the intensity of transmitted light dramatically changes from the initial value in accordance with a progress of the crystallization, and shows a constant value once the crystallization has progressed sufficiently. When a difference between the initial value of the intensity of transmitted light and the intensity of transmitted after sufficient progress of the crystallization is L, the difference ($t_{half}$–$t_0$) between $t_{half}$, which is the time until the intensity of transmitted light reaches the initial value +L/2, and $t_0$, which is the time at which the crystallization has started (time at which a change in the intensity of transmitted light has started), corresponds to the crystallization half-time $t_{1/2}$.

3-3. Injection Molding Test

Figure 2:
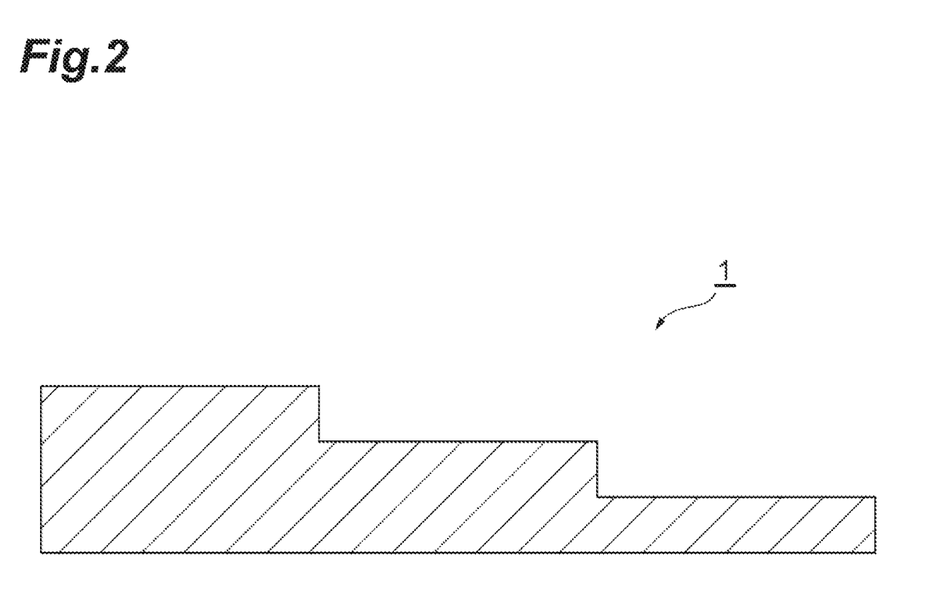
FIG. 2 is a cross-sectional view illustrating an embodiment of a precision-injection-molded body.

Pellets of the polypropylene resin composition were subjected to injection molding at molding temperature of 240° C. and die temperature of 40° C. with SE100 type injection molding machine (manufactured by Sumitomo Heavy Industries, Ltd.), and thus a 3-stage test specimen was obtained. The 3-stage test specimen is a plate-like body having a thickness at 3 stages (3 mm, 2 mm, and 1 mm). FIG. 2 is a cross-sectional view illustrating 3-stage test specimen 1, which is one embodiment of a precision-injection-molded body.

The obtained 3-stage test specimen was cut to have each thickness, and image sharpness at a position with thickness of 3 mm was measured with an image sharpness gloss meter (DGM-30) manufactured by Murakami Color Research Laboratory. After the measurement, the test specimen was subjected to a heating treatment for 24 hours in an oven at 70° C., and the image sharpness at the same position was measured. Higher image sharpness means fewer occurrence of deformation after molding. In the present specification, the occurrence of deformation after molding was evaluated based on a value of image sharpness after the above heating treatment.

In addition, transparency of the obtained 3-stage test specimen was visually observed, and the transparency was evaluated as follows: a case where the transparency is excellent is graded "A", a case where the transparency is clearly poor is graded "C", and a case that is present between those two cases is graded "B".

Furthermore, die cleanness was evaluated as follows: a case where die contamination is little during injection molding is graded "A", and a case where slight die contamination is shown is graded "B"

TABLE 2

| | | Examples | | | | | | | |
|---|---|---|---|---|---|---|---|---|---|
| | | 1 | 2 | 3 | 4 | 5 | 6 | 7 | 8 |
| Polypropylene-based polymer (% by mass) | A-1 | 100 | — | — | 100 | 100 | 100 | 100 | 100 |
| | A-2 | — | 100 | — | — | — | — | — | — |
| | A-3 | — | — | 100 | — | — | — | — | — |
| | A-4 | — | — | — | — | — | — | — | — |
| | A-5 | — | — | — | — | — | — | — | — |
| Anti-oxidant (ppm by mass) | Irganox 1010 | 1000 | 1000 | 1000 | 1000 | 1000 | 1000 | 1000 | 1000 |
| | Irgafos 168 | 400 | 400 | 400 | 400 | 400 | 400 | 400 | 400 |
| Neutralizing agent (ppm by mass) | DHT-4C | 500 | 500 | 500 | 500 | 500 | 500 | 500 | 500 |
| Nucleating agent (ppm by mass) | Metal salt of carboxylic acid HPN68L | 600 | 600 | 600 | 100 | — | 3000 | — | 600 |
| | Metal salt of phosphoric acid ester NA-21 | — | — | — | — | 600 | — | 3000 | — |
| | Irgaclear XT386 | — | — | — | — | — | — | — | — |
| | Gel All MD | — | — | — | — | — | — | — | — |
| Peroxide master batch (peroxide ppm by mass) | E-1 | 3500 | 7500 | — | 3500 | 3500 | 3500 | 3500 | — |
| Ethylene content (% by mass) of polypropylene-based polymer | | 3.8 | 4.8 | 2.3 | 3.8 | 3.8 | 3.8 | 3.8 | 3.8 |
| MFR (g/10 min) of polypropylene resin composition | | 22 | 20 | 23 | 25 | 21 | 25 | 23 | 5 |
| Mw/Mn of polypropylene resin composition | | 2.5 | 2.3 | 5.2 | 2.7 | 2.7 | 2.8 | 2.6 | 3.7 |
| Crystallization half-time (110° C.) (sec) | | 7 | 5 | 4 | 7 | 13 | 7 | 10 | 10 |
| Image sharpness (%) | Initial state | 95.4 | 96.8 | 95.0 | 96.2 | 94.2 | 96.2 | 94.0 | 92.0 |
| | After heating treatment at 70° C. for 24 hr | 93.1 | 96.4 | 92.3 | 95.6 | 94.5 | 95.6 | 92.9 | 91.4 |
| Transparency | | A | A | A | B | A | A | A | A |
| Die cleanness | | A | A | A | A | A | B | B | A |

TABLE 3

|  |  | Comparative Examples | | | | | |
| --- | --- | --- | --- | --- | --- | --- | --- |
|  |  | 1 | 2 | 3 | 4 | 5 | 6 |
| Polypropylene-based polymer (% by mass) | A-1 | 100 | — | 100 | — | 100 | 100 |
|  | A-2 | — | — | — | — | — | — |
|  | A-3 | — | — | — | — | — | — |
|  | A-4 | — | 100 | — | — | — | — |
|  | A-5 | — | — | — | 100 | — | — |
| Anti-oxidant (ppm by mass) | Irg 1010 | 1000 | 1000 | 1000 | — | 1000 | 1000 |
|  | Irg 168 | 400 | 400 | 400 | — | 400 | 400 |
| Neutralizing agent (ppm by mass) | DHT-4C | 500 | 500 | 500 | — | 500 | 500 |
| Nucleating agent (ppm by mass) | Metal salt of carboxylic acid HPN68L | — | 600 | — | — | — | — |
|  | Metal salt of phosphoric acid ester NA-21 | — | — | 100 | — | — | — |
|  | Irgaclear XT386 | — | — | — | — | — | 200 |
|  | Gel All MD | — | — | — | — | 2000 | — |
| Peroxide master batch (peroxide ppm by mass) | E-1 | 3500 | 3000 | 3500 | — | 3500 | 3500 |
| Ethylene content (% by mass) of polypropylene-based polymer |  | 3.8 | 0 | 3.8 | 0.6 | 3.8 | 4 |
| MFR (g/10 min) of polypropylene resin composition |  | 20 | 27 | 23 | 30 | 24 | 21 |
| Mw/Mn of polypropylene resin composition |  | 2.9 | 2.9 | 2.8 | 2.3 | — | — |
| Crystallization half-time (110° C.) (sec) |  | 96 | 2 | 80 | 59 | 55 | 22 |
| Image sharpness (%) | Initial state | 91.0 | 90.3 | 95.4 | 90.4 | 82.6 | 61.4 |
|  | After heating treatment at 70° C. for 24 hr | 87.3 | 85.9 | 90.3 | 87.2 | 80.2 | 58.4 |
| Transparency |  | C | C | B | C | A | A |
| Die cleanness |  | A | A | A | A | A | A |

EXAMPLES 9 AND 10

Raw materials having composition described in Table 4 (parts by mass) were dry-blended under nitrogen atmosphere with a Henschel mixer. The obtained mixture was melt-kneaded at 250° C. under nitrogen atmosphere with a monoaxial extruder (manufactured by TANABE PLASTICS MACHINERY CO., LTD., screw diameter of 40 mmϕ, VS40-28), and thus pellets of the polypropylene resin composition were obtained. For the obtained pellets, the crystallization half-time, image sharpness, transparency, and die cleanness were evaluated in the same manner as Example 1. The results are shown in Table 4.

TABLE 4

|  |  | Example 9 | Example 10 |
| --- | --- | --- | --- |
| Polypropylene-based polymer (% by mass) | A-1 | 100 | — |
| Anti-oxidant (ppm by mass) | Irganox 10102 | 1000 | 1000 |
|  | Irgafos 168 | 400 | 400 |
| Neutralizing agent (ppm by mass) | DHT-4C | 500 | 500 |
| Nucleating agent (ppm by mass) | MB-1 | 1.2 (HPN-68L: 600 ppm by mass) | — |
|  | MB-2 | — | 3.5 (HPN-68L: 600 ppm by mass) |
| Peroxide master batch (peroxide ppm by mass) | E-1 | 3500 | 3500 |
| Ethylene content (% by mass) of polypropylene-based polymer |  | 3.8 | 3.8 |
| MFR (g/10 min) of polypropylene resin composition |  | 23 | 30 |
| Mw/Mn of polypropylene resin composition |  | 2.7 | 2.8 |
| Crystallization half-time (110° C.) (sec) |  | 9 | 9 |
| Image sharpness (%) | Initial state | 93.4 | 94.3 |
|  | After heating treatment at 70° C. for 24 hr | 92.5 | 93.5 |
| Transparency |  | A | A |
| Die cleanness |  | A | A |

From the evaluation results shown in Table 2, Table 3, and Table 4, it was confirmed that, with a polypropylene resin composition which contains a polypropylene-based polymer having ethylene content of 2 to 10% by mass and the crystallization half-time at 110° C. thereof is 20 seconds or shorter, an occurrence of deformation after molding of a precision-injection-molded body can be reduced.

REFERENCE SIGNS LIST

1: 3-stage test specimen (precision-injection-molded body).

The invention claimed is:
1. A polypropylene resin composition for precision-injection-molding, comprising a polypropylene-based polymer, a peroxide and a nucleating agent, the polypropylene-based polymer comprising, as monomer units, propylene and at least one copolymerization monomer of ethylene, wherein
the proportion of the monomer units derived from the copolymerization monomer in the polypropylene-based polymer is 3 to 5% by mass based on the mass of the polypropylene-based polymer,
the crystallization half-time at 110° C. of the polypropylene resin composition is 8 seconds or shorter,
the content of the nucleating agent is about 600 ppm by mass based on the mass of the polypropylene-based polymer, the nucleating agent comprises a lithium salt of aliphatic monocarboxylic acid with carbon atom number of 8 to 20 or disodium (1R,2R,3S,4S)-bicyclo[2.2.1]heptane-2,3-dicarboxylate, and the peroxide is an alkyl peroxide, and the content of the peroxide is 3500 ppm to 7500 ppm by mass based upon the mass of the polypropylene-based polymer.

2. The polypropylene resin composition for precision-injection-molding according to claim 1, wherein the polypropylene resin composition for precision-injection-molding is used for forming a mold for molding an optical member by precision-injection-molding.

3. The polypropylene resin composition for precision-injection-molding according to claim 1, wherein the alkyl peroxide is 2,5-dimethyl-2,5-di(t-butylperoxy)hexane).

4. The polypropylene resin composition for precision-injection-molding according to claim 1, wherein the nucleating agent is disodium (1R,2R,3S,4S)-bicyclo[2.2.1]heptane-2,3-dicarboxylate.

5. A precision-injection-molded body composed of the polypropylene resin composition for precision-injection-molding according to claim 1.

6. A method for producing a precision-injection-molded body comprising a step of forming a precision-injection-molded body by precision-injection-molding of the polypropylene resin composition for precision-injection-molding according to claim 1.

7. A mold for molding an optical member comprising the precision-injection-molded body according to claim 5.

8. A method for producing an optical member comprising a step of forming an optical member by molding a molding material with the mold for molding an optical member according to claim 7 as a mold.

9. The method for producing an optical member according to claim 8, wherein the step of forming an optical member comprises adding the peroxide during melt-kneading.

* * * * *